(12) United States Patent  
Malone

(10) Patent No.: US 12,261,562 B2  
(45) Date of Patent: Mar. 25, 2025

(54) APPARATUS AND METHOD FOR THE INTEGRATED CONTROL OF A THERMAL MANAGEMENT SYSTEM

(71) Applicant: COOPER-STANDARD AUTOMOTIVE INC, Northville, MI (US)

(72) Inventor: David S. Malone, Attica, MI (US)

(73) Assignee: Cooper-Standard Automotive Inc., Northville, MI (US)

( * ) Notice: Subject to any disclaimer, the term of this patent is extended or adjusted under 35 U.S.C. 154(b) by 268 days.

(21) Appl. No.: 17/828,767

(22) Filed: May 31, 2022

(65) Prior Publication Data

US 2023/0387835 A1 Nov. 30, 2023

(51) Int. Cl.
*H02P 5/56* (2016.01)
*F16K 31/04* (2006.01)
*F16K 37/00* (2006.01)
*G05D 7/06* (2006.01)
*H02P 23/24* (2016.01)
*B60H 1/00* (2006.01)
*B60L 58/26* (2019.01)

(52) U.S. Cl.
CPC ............. *H02P 5/56* (2016.02); *F16K 31/046* (2013.01); *F16K 37/0041* (2013.01); *G05D 7/0676* (2013.01); *H02P 23/24* (2016.02); *B60H 1/00278* (2013.01); *B60L 58/26* (2019.02)

(58) Field of Classification Search
CPC ....................................................... H02P 5/56
See application file for complete search history.

(56) References Cited

U.S. PATENT DOCUMENTS

| | | | |
|---|---|---|---|
| 6,374,780 B1 * | 4/2002 | Rutyna | F01P 7/167 236/35 |
| 10,450,941 B2 * | 10/2019 | Cunningham | F01P 7/10 |
| 10,605,151 B2 * | 3/2020 | Gonze | F01P 7/16 |
| 10,669,922 B2 * | 6/2020 | Gonze | F01P 5/10 |
| 10,982,627 B2 * | 4/2021 | Keblusek | F02D 41/005 |
| 11,628,704 B2 * | 4/2023 | Bray | B60H 1/00885 454/69 |
| 2017/0356327 A1 | 12/2017 | Gonze et al. | |
| 2021/0283978 A1 | 9/2021 | Bray et al. | |
| 2023/0387835 A1 * | 11/2023 | Malone | H02P 5/56 |

OTHER PUBLICATIONS

Search Report and Written Opinion for PCT/US2023/019628 dated Jul. 17, 2023.

* cited by examiner

*Primary Examiner* — Michael A Berns
(74) *Attorney, Agent, or Firm* — Paschall & Associates, LLC; James C. Paschall; Anthony Miologos

(57) ABSTRACT

An integrated apparatus and method is disclosed for controlling a fluid pump and a valve connected to a coolant loop. The fluid pump for circulating fluid through the coolant loop and the valve positionable between a first and a second position. A controller generates control signals that are transmitted to the fluid pump and to the valve for regulating the speed of the fluid pump and the flow of the fluid circulating through the coolant loop and to position the valve into either the first or the second position.

20 Claims, 5 Drawing Sheets

| Control Block | | 1.00 | 1.20 | 1.40 | 1.60 | 1.80 | 2.00 | 3.00 | 3.20 | 3.40 | 3.60 | 3.80 | 4.00 |
|---|---|---|---|---|---|---|---|---|---|---|---|---|---|
| Drive | Pump Motor PWM | 0% | 20% | 40% | 60% | 80% | 100% | 0% | 20% | 40% | 60% | 80% | 100% |
| Drive | Valve Motor ON/OFF | OFF | ON | ON | ON | ON | ON | OFF | ON | ON | ON | ON | ON |
| Target | Valve Sensor Position | 1vDC | 1vDC | 1vDC | 1vDC | 1vDC | 1vDC | 4vDC | 4vDC | 4vDC | 4vDC | 4vDC | 4vDC |
| Actual | Valve Port A Open | 0% | 0% | 0% | 0% | 0% | 0% | 100% | 100% | 100% | 100% | 100% | 100% |
| Actual | Valve Port B Open | 100% | 100% | 100% | 100% | 100% | 100% | 0% | 0% | 0% | 0% | 0% | 0% |

FIG. 5 ns. One example of a thermal
APPARATUS AND METHOD FOR THE INTEGRATED CONTROL OF A THERMAL MANAGEMENT SYSTEM

TECHNICAL FIELD

This disclosure is generally directed to thermal management systems. More specifically, it relates to an apparatus and method for providing integrated control of fluid pumps and valves used in a thermal management system.

BACKGROUND

Electrically operated fluid pumps are known and commonly used to move fluids in thermal management systems, such as coolant in a vehicle. One example of a thermal management system is the cooling of battery systems of a hybrid or purely electric vehicle. The fluid pumps are operated at various speeds to increase or decrease the flow of coolant through the thermal management system based on demand from a vehicles central computer. Valves may be used downstream from the fluid pump to regulate flow from the pump to ensure the distribution of the coolant throughout the thermal management system. The valves may also be used to switch in or out the use of various devices such as for example chillers for cooling the coolant. The valves each require use of an electrical actuator to switch the flow of coolant through the valve. The valve actuator operates to move valve components to switch the flow through various passages in the valve using control signals from the vehicles central computer. Electrical and control connections between each fluid pump and valve of a thermal management system and the vehicles central computer use separate wiring bundles to the various locations where the pumps and valves are located resulting in wiring complexity and high component costs.

SUMMARY

This disclosure relates to an apparatus and method for providing integrated control of fluid pumps and valves used in a thermal management system.

In a first embodiment an apparatus is disclosed comprising, a fluid pump connected to a coolant loop that circulates fluid through the coolant loop and a valve connected to the coolant loop arranged to be positionable between a first and a second position. A controller is operable to generate control signals to the fluid pump that sets the rate of fluid flow through the coolant loop and to the valve that positions the valve into either the first or the second position.

In a second embodiment a method is disclosed for controlling a fluid pump and a valve connected to a coolant loop, the fluid pump for circulating fluid through the coolant loop and the valve positionable between a first and a second position, the method comprising, generating control signals by a controller that are transmitted to the fluid pump and valve that regulates the speed of the fluid pump and the flow of fluid circulating through from the coolant loop and to position the valve into either the first or the second position.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIG. 5 illustrates an example of the control block firmware executable by the process controller of the present disclosure.

DETAILED DESCRIPTION

The figures, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
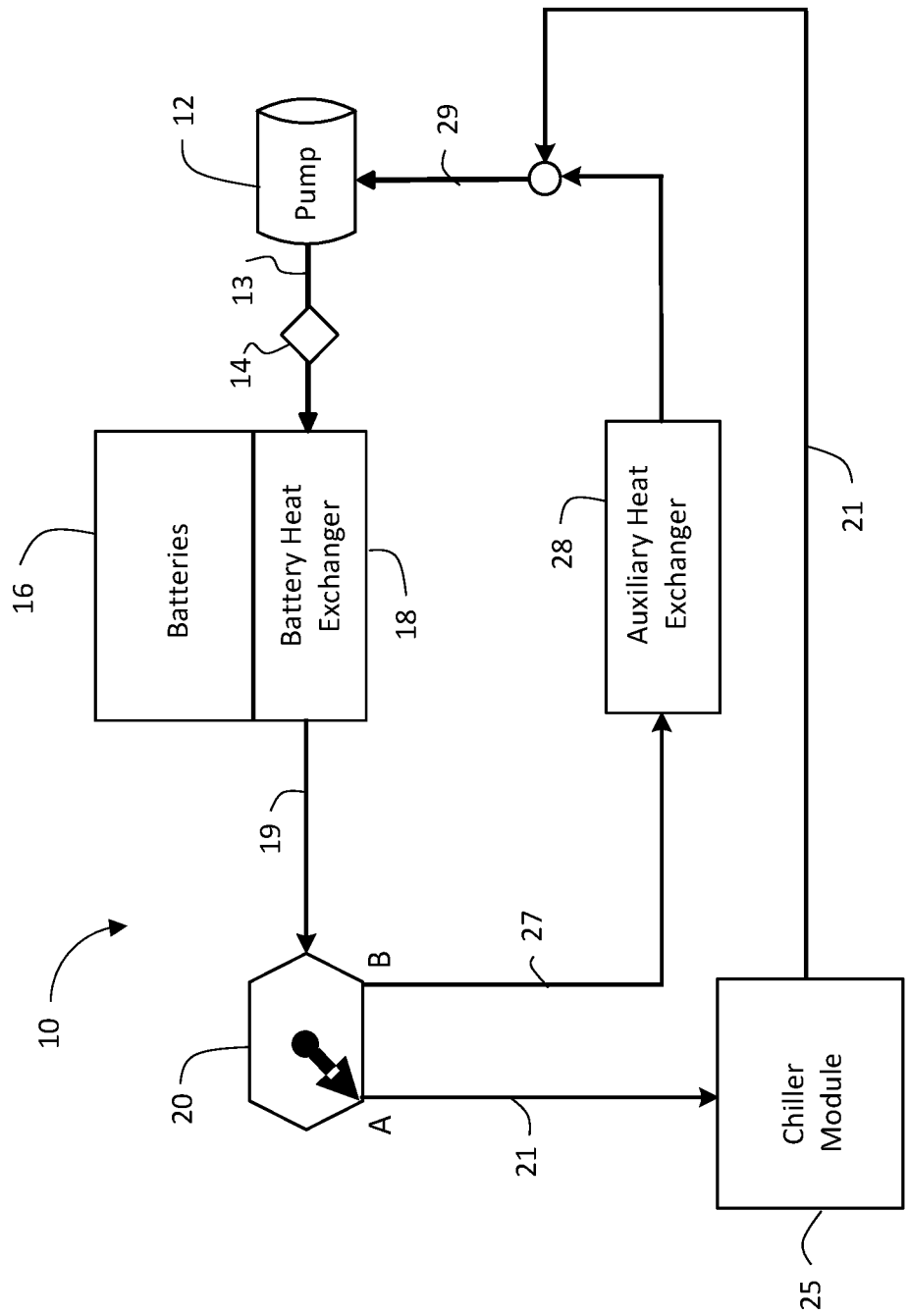
FIG. 1 illustrates a block diagram of an exemplary thermal management system of the present disclosure.

It may be useful to describe a thermal management system that may use the device and method of the present disclosure. FIG. 1 illustrates in block diagram of an exemplary thermal management system 10 for cooling the battery of a hybrid or purely electric vehicle. The thermal management system 10 uses a coolant loop to maintain the desired temperature condition of the vehicle's batteries 16. In this example, coolant flow and the direction of the flow is controlled respectively by one independent electrically driven fluid pump 12 and one independent electrically actuated valve 20. The coolant loop of the thermal management system 10 positions the fluid pump 12 and a temperature sensor 14, upstream of a battery heat exchanger 18 that is attached to the vehicles batteries 16. A valve 20 has an input connected to conduit 19 downstream of the heat exchanger 18. A chiller module 25 is connected downstream of valve 20 to an outlet port A of the valve 20 via a conduit 21. Conduit 21 passes through the chiller 25 and is connected to conduit 29 and the downstream input or suction input of fluid pump 12. The valve 20 may also be operated to switch flow out of outlet port B to conduit 27 switching the coolant loop to flow to an auxiliary heat exchanger 28. The fluid pump 12 receives the fluid from the auxiliary heat exchanger 28 to the fluid pump's suction input via conduit 29.

The battery heat exchanger 18 transfers heat produced by the batteries 16 to the coolant fluid flowing though the heat exchanger 18. An electric pump motor 65 drives the fluid pump 12. The pump motor 65 is electrically operated to turn off, turn on, and to rotate when turned on at various speeds by regulating the pulse width modulation (PWM) of the voltage applied across the motor's terminals. The electrical pump motor 65 causes pumping components of the fluid pump 12, such as for example an impeller, to receive fluid from the coolant loop at a suction inlet connected to conduit 29 and discharge fluid from an outlet connected to conduit 13. A sensor 14 attached to conduit 13 measures the temperature of the coolant fluid entering the battery heat exchanger 18 and provides a reading that determines operational settings for the valve 20 outlet ports and the speed of fluid pump 12 (flow) required to reach a desired temperature state. The flow from the heat exchanger 18 arrives at valve 20 via conduit 19. In the example of FIG. 1, the valve 20 is shown having its first outlet port A connected to conduit 21 connecting the chiller module 25 to the cooling loop in s first position. With the valve 20 in the first position flow is directed to the chiller module 25 that will reduce the temperature of the coolant. The chilled coolant then arrives back at the fluid pump 12 via conduits 21 and 29 to be further moved across the battery heat exchanger 18 by fluid pump 12 to continue the cooling cycle.

If the batteries 16 do not require substantial cooling the valve 20 may be operated into a second position connecting the cooling loop from outlet port B of valve 20 to an auxiliary heat exchanger 28. The auxiliary heat exchanger 28 may be a part of a cabin heater system, a window defogging system or simply part of a cooling system that passes air over the heat exchanger 28 to reduce the heat contained in the coolant without the need of chilling. The cooled coolant then arrives back at the fluid pump 12 via conduits 27 and 29 to be further moved across the battery heat exchanger 18.

Although FIG. 1 illustrates one example of a thermal management system 10, various changes may be made to FIG. 1. For example, the thermal management system may include any number of pumps, valves, heat exchangers, chillers, and other components. Also, the makeup and arrangement of the system 10 in FIG. 1 is for illustration only. Components could be added, omitted, combined, or placed in any other suitable configuration according to particular needs. Further, particular functions have been described as being performed by particular components of the system 10. This is for illustration only. In general, thermal management systems are highly configurable and can be configured in any suitable manner according to particular needs.

Figure 2:
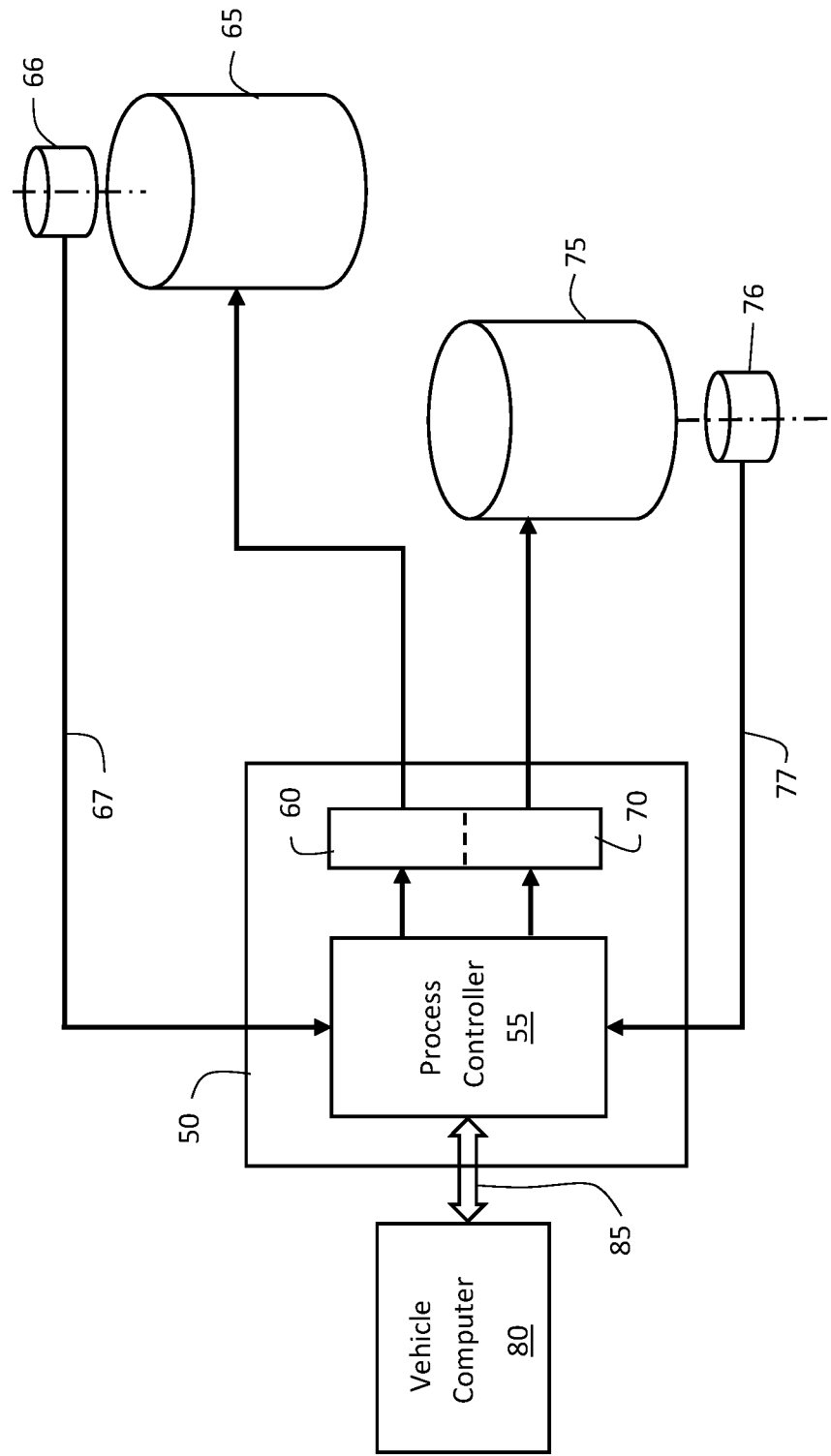
FIG. 2 illustrates an example apparatus that may be used for the integrated control of a fluid pump and valve used in the thermal management system of the present disclosure.

FIG. 2 illustrates an example apparatus that may be used for delivering integrated control of the fluid pump 12 and the valve 20 of the thermal management system 10 of the present disclosure. The integrated control of the fluid pump 12 and valve 20 is provided by a control system 50. The control system 50 may include a process controller 55, and motor drivers 60 and 70. The control system 50 is communicatively coupled to one or more motors 65 and 75 via the motor drivers 60 and 70, respectively. The motors 65 and 75 may include pump motors, valve actuators, actuatable switches (e.g., solenoids), positioners, and so on. In the present disclosure, device driver 60 provides power and control signals to an electrical motor 65 that drives fluid pump 12. Similarly, device driver 70 provides power and control signals to an electrical motor 75 that acts as a valve actuator to position valve 20.

A position sensor 76 is electrically or mechanically connected to the valve actuator motor 75 that provides feedback signals of the current position of the valve actuator motor 75 to the process controller 55 via line 77. The sensor 76 may be an electrical device that produces an electrical DC voltage that represents the position of the valve actuator motor 75 corresponding to the outlet port A or outlet port B of valve 20. For example, with the valve 20 in the first position coolant flows from the outlet port A, the valve sensor 76 may provide a voltage of 4 vDC as a feedback signal to process controller 55 representing that the valve outlet port A is open and the valve outlet port B is closed. Similarly, a feedback signal of 1 vDC may represent that the valve outlet port A is closed, and valve outlet port B is open.

An RPM sensor 66, such as a magnetic pickup, a hall effect device, or an optical sensor device may be attached to pump motor 65 to provide a voltage or current (amperage) feedback signal of the RPM of the pump motor 65. The RPM feedback signal representing the actual speed of the pump motor 65. The RPM signal is fed back to process controller 55 from sensor 66 via line 67. A vehicle computer 80 is connected to process controller 55 via a communications bus 85. The vehicle computer 80 sending control commands to the processing controller 55. The vehicle computer also receives status reports of the valve position, pump motor speed and power as well as diagnostic data representing errors detected by the control system 50.

Figure 3:
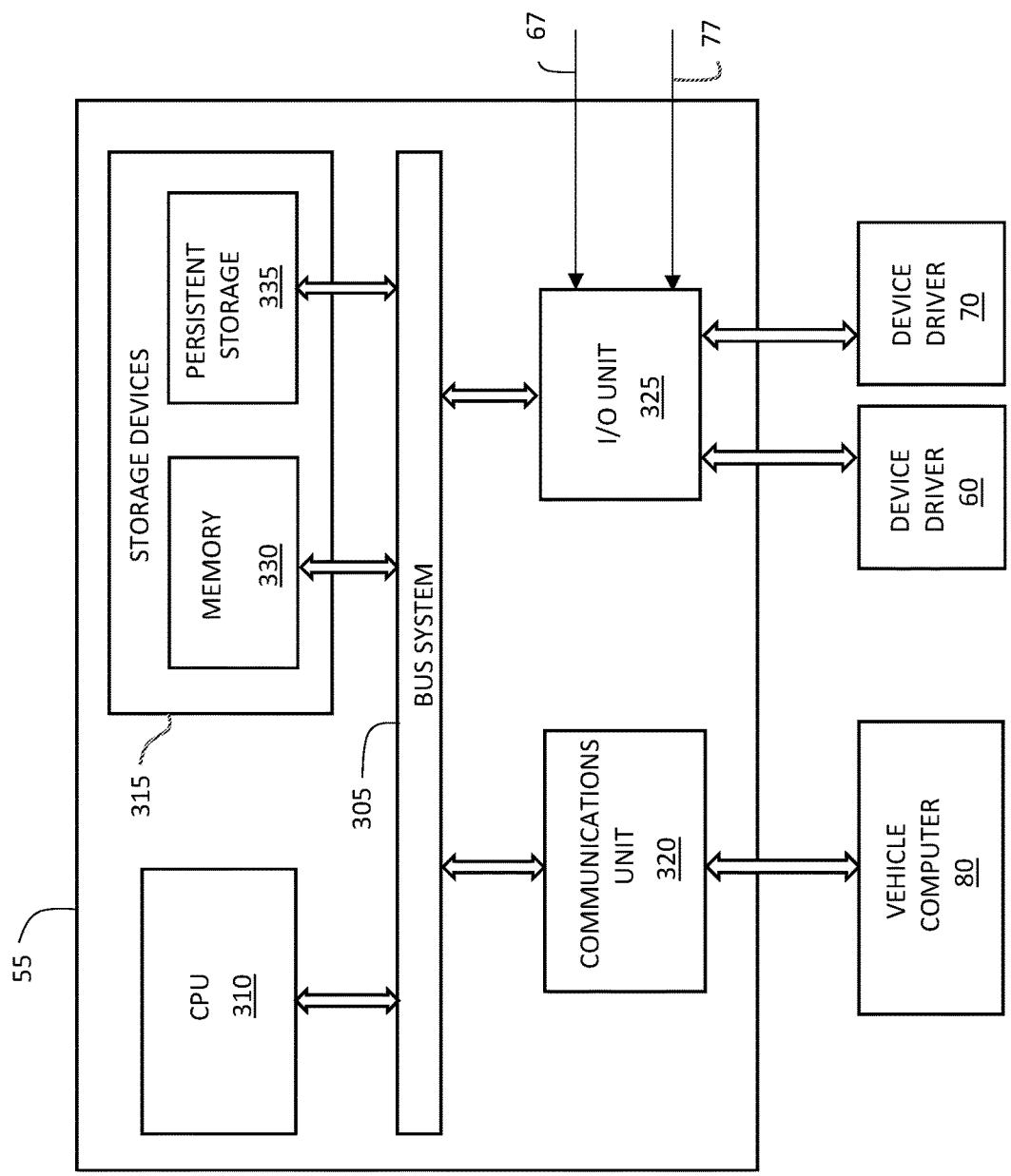
FIG. 3 illustrates an example process controller of the present disclosure.

FIG. 3 illustrates an example process controller 55 according to the present disclosure. As shown in FIG. 3, the process controller 55 may include a bus system 305, which supports communication between at least one central processing unit (CPU) 310, at least one storage device 315, at least one communications unit 320, and at least one input/output (I/O) unit 325. The CPU 310 executes instructions that may be loaded into a memory 330 or persistent storage 335 of storage device 315. The CPU 310 may include any suitable number(s) and type(s) of processors or other devices in any suitable arrangement. Example types of processing devices 310 include microprocessors, microcontrollers, digital signal processors, field programmable gate arrays, application specific integrated circuits, and discreet circuitry.

The memory 330 and a persistent storage 335 are examples of storage devices 315, which represent any structure(s) capable of storing and facilitating retrieval of information (such as data, program code, and/or other suitable information on a temporary or permanent basis. The memory 330 may represent a random access memory (RAM) or any other suitable volatile or non-volatile storage device(s). The persistent storage 335 may contain one or more components or devices supporting longer-term storage of data, such as a read only memory (ROM), or flash memory. The storage devices 315 may include computer programs or instructions executable by the CPU 310 and suitable for controlling the pump motor 65 of the fluid pump 12 and the valve actuator motor 75 of the valve 20. The memory 330 or the persistent storage 335 may further include computer programs or instructions executable by the CPU 310 and suitable for detecting the actual position of the valve actuator motor 75 and the actual RPM of motor 65 generated by sensors 76 and 66 respectively.

The communications unit 320 supports communications with other systems or devices. For example, the communications unit 220 could include a network interface for communication over a network 85 to the vehicle computer 80. Control signals in the form of serial control signals or packets of control data may be sent from the vehicle computer 80 to communication unit 320 for use by the CPU 310. Similarly, the communication unit 320 can transfer data and reports from the CPU 310 or storage devices 315 to the vehicle computer 80. For example, the process controller 55 may send reports confirming the reception of commands and control signals sent from the vehicle computer 80 to the process controller 55 and returning reports to the vehicle computer 80 confirming the actual position of the valve 20 and speed of the fluid pump 12. The communication unit 320 may also send diagnostic data of the operating health of the motors 65 and 75 to the vehicle computer 80.

The I/O unit 325 allows for the input and output of control signals and data between the process controller 55 and external devices. For example, the I/O unit 325 connects to device drivers 60 and 70 to issue commands to device driver 60 and device driver 70 that drive and control the operation of the pump motor 65 and valve actuator motor 75. The device drivers 60 ad 70 are shown as two separated devices in FIG. 3 however, the device drivers may also be a single device having driver sections 60 and 70 electrically separated from the other. Additionally, The I/O unit 325 is communicatively connected to the feedback signals generated by the RPM sensor 66 and position sensor 76.

It should be noted that this disclosure uses a process controller 55 and individual components as an example to explain the invention of the disclosure, it will be understood by those skilled in the art, that other devices may be used for the process controller 55, such as for example, a microcontroller, or an application specific integrated circuit (ASIC) that may combine the CPU 310, memory 330 the I/O unit into a single integrated device.

Figure 4:
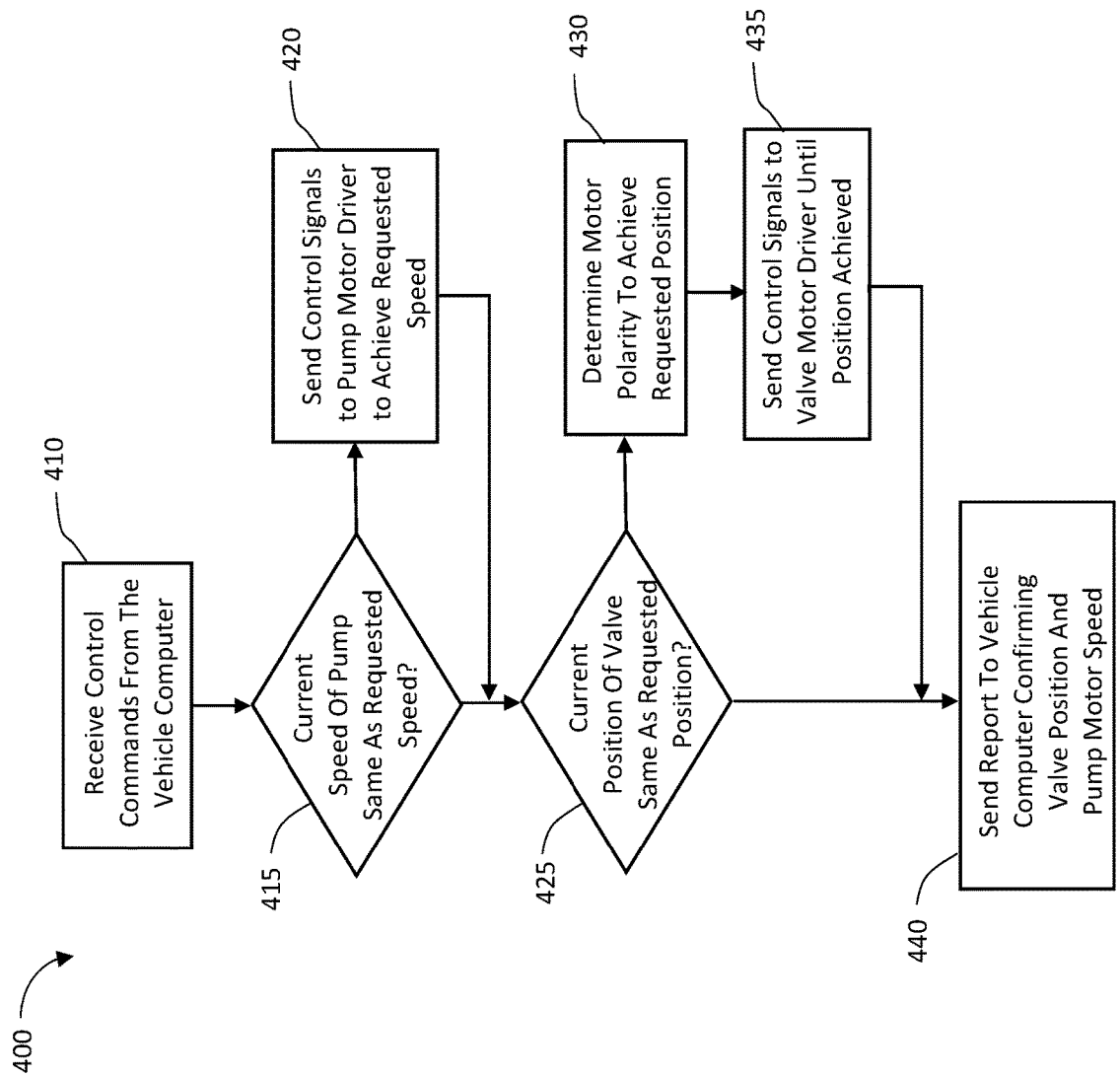
FIG. 4 illustrates an example flow diagram of the operational steps of the operating program of the present disclosure.

An operating program 400 stored in memory 330 and shown in FIG. 4 is executed by CPU 310 to provide the integrated control of both the fluid pump 12 pump motor 65 and the valve 20 valve actuator motor 75. Both the speed values for the pump motor 65 and positional values for valve actuator motor 75 are contained in a plurality of control blocks stored in the memory 330. FIG. 5 illustrates an example of the control block firmware 500 that can be executed by process controller 55. Control blocks 510 further arbitrarily identified as 1.00 to 2.00 and 3.00 to 4.00 provide a plurality of incremental blocks of pump motor PWM values, valve motor on/off values, valve sensor position values and valve outlet port A and valve outlet port B opening values. Each increment representing a block of control values for both the pump motor 65 and the valve actuator motor 75. The process controller 55 may receive a command input from the vehicle computer 80 that identifies a control block to be used by the operating program of FIG. 4. The operating program 400 would use the data contained in the control blocks of firmware 500 to set the pump motor 65 speed, and the position of the valve actuator motor 75 that consequently positions the valve 12 outlet ports A and B.

It should be further noted that only a small set of incremental control blocks is shown in the example of FIG. 5 for ease of explaining the disclosure. It would be understood by those skilled in the art, that the control blocks may be subdivided into more increments. For example, the increments may be subdivided to provide control values every 5% or 10% of pump motor PWM. The control blocks may also include control blocks for more than one pump motor or more than one actuator motor that may be used in a thermal management system. Additionally, incremental control blocks may be provided for valve port settings that allow for blended output flow from both valve outlet ports A and B simultaneously that may be used in complex thermal management systems.

The example method of FIG. 4 illustrates the operational steps of the operating program 400 executed by the CPU 310. In operation 410 the process controller via the communication unit 320 receives a command input from the vehicle computer 80. The CPU 310 interprets the command input and locates the firmware 500 control block stored in memory 330 associated with the input command.

First, in operation 415, the CPU 310 retrieves the currently set speed of the pump motor 65. This may be done by either reading the RPM of the pump motor from the RPM sensor 66, or from pump motor data stored in memory 330 from the last executed control block. If the motor speed requested is different than the currently set pump motor speed, then a control signal is sent to the pump motor driver 60 to establish the new pump speed in operation 420. For example, if the input command from the vehicle computer 80 requests that control block 1.40 be performed, the pump motor 65 would be required to be set a pump speed of 40%, see FIG. 5.

If the current motor pump speed provided by RPM sensor 66 or if the pump speed set from the last data block execution is different from the new requested pump speed, then the motor driver 60 is signaled to increase or decrease the pump motor PWM until the new pump speed of 40% is achieved. When the pump motor speed reaches the new pump speed, as reported by the feedback signal from RPM sensor 66, the program jumps to operation 425. If the new command input requests a pump speed that is the same as the currently set pump speed, the program continues to operation 425 without executing operation 420.

Next in operation 425 the current position of valve 20 is ascertained. This may be done by reading the feedback signal from the sensor 76. Sensor 76 provides a sensor voltage that differs from a voltage reference, as explained above. The difference in the sensed voltage represents the actuator motor 75 actual position. The current position of valve 20 may also be ascertained by using the last sensed sensor voltage stored in memory 330 from the last executed control block.

If the requested valve position is different from the currently set valve position, then the program determines the currently set valve actuator motor polarity in order to properly turn the valve in the correct direction. For example, the valve 20 shown in FIG. 1 is shown placed in the first position directing coolant flow through outlet port A. To have placed the valve outlet from outlet port B to outlet port A in a previous operation, a forward voltage polarity to valve actuator motor 75 would have been applied turning the valve actuator motor 75 in a clockwise direction. To place the valve in the second position directing flow through outlet port B the valve actuator motor 75 must turn counter clockwise. Therefore, a reverse voltage polarity must be applied to the valve actuator motor 75 to turn the valve actuator motor 75 counter clockwise. Data stored in memory 330 from the last executed command input would also save the current polarity of the valve actuator motor 75 which may be used to determine the proper rotation for the positioning the valve 20.

Once the polarity of the motor is established then a control signal is sent to the valve actuator motor driver 70 in operation 435, to turn the valve actuator motor 75 in the proper direction to achieve the new valve position. For example, in our example where the vehicle computer 80 requests that control block 1.40 be performed, the valve actuator motor 75 would need to be set to have valve outlet port B open 100%, see FIG. 5. If the current difference voltage provided by the valve position sensor 76 is different from the requested valve position defined in control block 1.40, then the valve actuator motor 70 is signaled to turn in the direction established in operation 430 to place the valve in the second position and placing 100% of the flow from valve 20 through outlet port B. When the motor actuator 76 reaches the valve position B the valve position sensor 76 provides a 1 vDC feedback signal to the CPU 310 establishing that the valve is now in the second position and the program jumps to operation 440. If the new command input requests a valve position that is the same as the currently set valve position, then the program continues to operation 440 without executing operations 430 and 435. In step 440 the process controller 55 sends a report to the vehicle computer 80 confirming the valve 12 position and the speed (flow rate) of the fluid pump 12.

It may be advantageous to set forth definitions of certain words and phrases used throughout this patent document. The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," or "controller" within a claim is understood and intended to refer to structures known to those skilled in the relevant art, as further modified or enhanced by the features of the claims themselves and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
    a fluid pump connected to a coolant loop for circulating fluid through the coolant loop;
    a valve connected to the coolant loop, the valve arranged to be positionable between a first and a second position;
    a memory storing a plurality of control blocks containing control values;
    a controller connected to the memory;
    a first sensor connected to the controller for sensing and reporting the speed of the fluid pump to the controller; and
    a second sensor connected to the controller for sensing and reporting the position of the valve to the controller, wherein the controller is operable to send the control values contained in one of the plurality of control blocks to the fluid pump responsive to the speed of the fluid pump to set a rate of fluid flow through the coolant loop and responsive to the position of the valve to position the valve into either the first or the second position.

2. The apparatus of claim 1, wherein the controller includes:
    a central processing unit (CPU) connected to the memory; and
    an operating program stored in the memory that when executed by the CPU causes the controller to send the control values contained in one of the plurality of control blocks to the fluid pump and the valve.

3. The apparatus of claim 2, wherein the controller further includes;
    a communication unit connected to a vehicle computer and to the CPU, the communication unit including a network interface for communicating over a communication network to the vehicle computer arranged to receive control signals from the vehicle computer over the communication network; and
    a first device driver connected to the fluid pump and a second device driver connected to the valve.

4. The apparatus of claim 3, wherein each of the plurality of control blocks are organized to contain control values, the control values comprising at least one control value different from the control values contained in an adjoining control block wherein the control signals from the vehicle computer select one of the plurality of control blocks.

5. The apparatus of claim 4, wherein the control values include data for setting the rate of fluid flow produced by the fluid pump.

6. The apparatus of claim 5, wherein the control values include data for positioning the valve in the first or the second position.

7. The apparatus of claim 5, wherein the fluid pump is driven by an electrical pump motor connected to the first device driver, wherein the first device driver is arranged to receive the control values and send voltage data to the pump motor that sets the speed of the pump motor and the rate of fluid flow through the coolant loop.

8. The apparatus of claim 6, wherein the valve is driven by an electrical actuator motor connected to the second device driver, wherein the second device driver is arranged to receive the control values and send voltage data to the actuator motor that positions the valve in either the first or the second position.

9. The apparatus of claim 7, wherein the first sensor is a pump motor sensor operatively connected to the pump motor that provides feedback signals to the controller of the speed of the pump motor.

10. The apparatus of claim 8, wherein the second sensor is an actuator motor sensor operatively connected to the actuator motor that provides feedback signals to the controller of the valve first or second position.

11. The apparatus of claim 8, wherein the controller determines the direction to turn the actuator motor and sends control signals to the actuator motor driver that generates a voltage polarity that turns the actuator motor clockwise or a voltage polarity that turns the actuator motor counter clockwise before positioning the valve in either the first or second position.

12. The apparatus of claim 10, wherein the operating program sends reports to the vehicle computer using the communication unit confirming the speed of the pump motor and the valve first or second position.

13. The apparatus of claim 9 wherein the feedback signals sent by the pump motor sensor communicates the RPM of the pump motor.

14. The apparatus of claim 10, wherein the feedback signals generated by the actuator motor are represented by a DC voltage based on the valve's position.

15. A method for controlling a fluid pump and a valve connected to a coolant loop, the fluid pump for circulating fluid through the coolant loop and the valve positionable between a first and a second position, the method comprising;

storing a plurality of control blocks containing control values in a memory;
sensing the speed of the fluid pump with a first sensor;
sensing the position of the valve with a second sensor;
receiving by a controller the speed of the fluid pump from the first sensor and the position of the valve from the second sensor; and
sending by the controller the control values from one of the plurality of control blocks to the fluid pump and to the valve responsive to the speed of the fluid pump and the position of the valve, wherein the control values regulate the speed of the fluid pump and a rate of fluid flow circulating through from the coolant loop and position the valve into either the first or the second position.

16. The method of claim 15, wherein the controller includes: a central processing unit (CPU) connected to the memory, the method further including:
executing by the CPU an operating program stored in the memory that causes the controller to send the control values contained in the control block to the fluid pump and the valve.

17. The method of claim 16, wherein the CPU receives control signals from a vehicle computer, the method further comprising:
selecting a control block from the plurality of control blocks based on the control signals received by the CPU from the vehicle computer and the speed of the fluid pump reported by the first sensor and the position of the valve reported by the second sensor; and
sending by the operating program the control values contained in the selected control block to the fluid pump and valve.

18. The method of claim 17, wherein the control values include data for setting the rate of fluid flow through the coolant loop produced by the fluid pump.

19. The method of claim 17, wherein the control values include data for positioning the valve in the first or the second position.

20. An apparatus for providing integrated control of a fluid pump and a valve connected to a coolant loop in a vehicle, the apparatus comprising:
a memory storing a plurality of control blocks containing control values;
a first sensor operatively connected to the fluid pump for sensing the speed of the fluid pump;
a second sensor operatively connected to the valve for sensing the position of the valve; and
a controller connected to the first and the second sensor the memory and to a vehicle computer, the controller arranged to receive control signals from the vehicle computer,
wherein responsive to the received control signals and the speed of the fluid pump and the position of the valve the controller is operable to select and send the control values contained in one of the plurality of control blocks to the fluid pump to set a rate of fluid flow through the coolant loop and to the valve to switch fluid flow in the coolant loop.

* * * * *